UNITED STATES PATENT OFFICE.

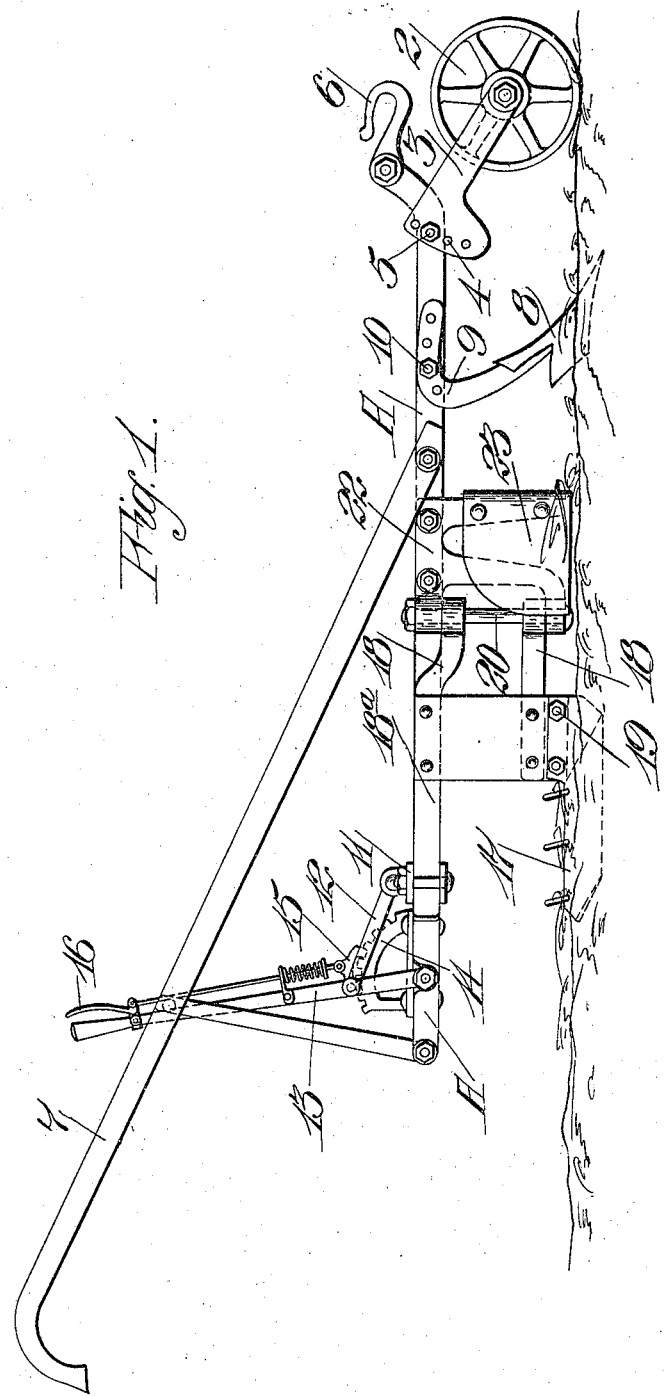

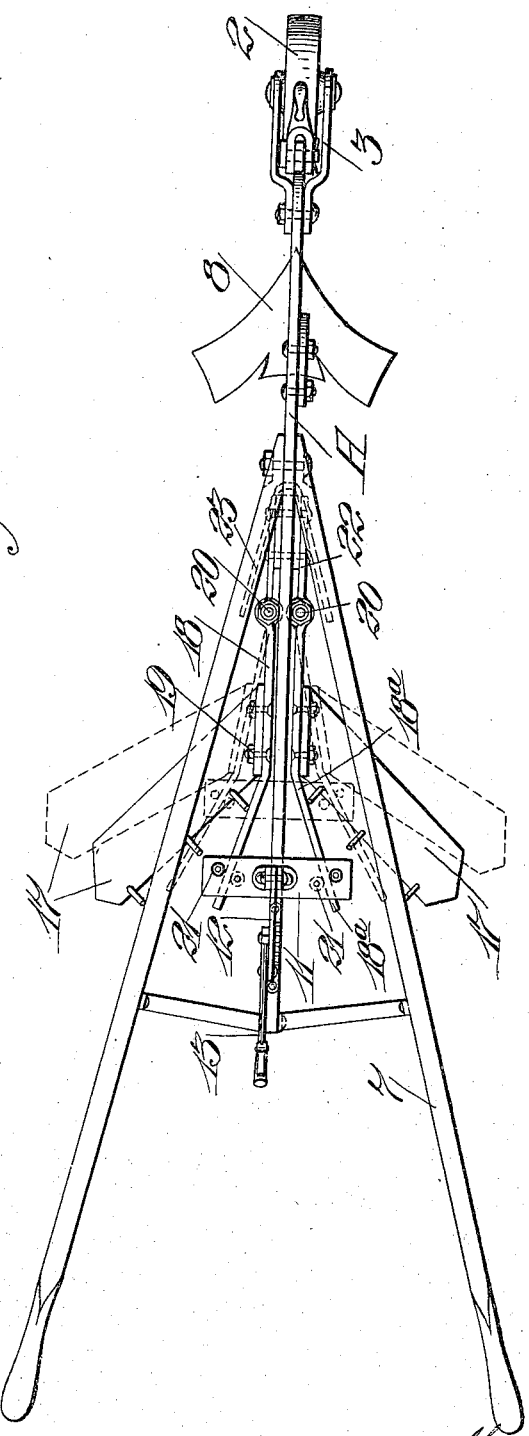

MARCELLUS PRUYN, OF FLORIN, CALIFORNIA.

WEED-CUTTER.

949,597.　　Specification of Letters Patent.　Patented Feb. 15, 1910.

Application filed June 21, 1909. Serial No. 503,545.

*To all whom it may concern:*

Be it known that I, MARCELLUS PRUYN, a citizen of the United States, residing at Florin, in the county of Sacramento and State of California, have invented new and useful Improvements in Weed-Cutters, of which the following is a specification.

My invention relates to an implement which is especially designed for cutting weeds and like purposes.

It consists of a mechanism whereby the cutting teeth or blades may be expanded or contracted while the implement is in motion so as to accommodate the cut to wide or narrow spaces between trees or plants.

My invention comprises also details of construction which will be more fully explained by reference to the accompanying drawings, in which—

Figure 1 is a side elevation. Fig. 2 is a plan view.

As shown in the drawings, A is a main central bar or frame, having a bearing-wheel 2 at the front, journaled and turnable in a yoke 3, and this yoke is widened vertically at the rear end having holes made in it as at 4, so that by means of a bolt as at 5 the position of the wheel may be changed to vary the cut which the apparatus will make.

6 shows a means for attaching the team by which the device is to be pulled.

7 are handles such as are usually employed for implements of this description.

To the front portion of the beam A is secured the double shovel plow 8, which may be adjustably fixed to the beam by means of the standard, which is bent as shown at 9, and has holes made in the portion extending approximately parallel with the beam A so that by means of a bolt 10, the position of this forward standard and its double shovel plow may be changed to vary the cut in unison with the changes that may be made in the position of the bearing-wheel.

Mounted upon the rear portion of the bar A is a slidable carriage 11, which may have antifriction rollers as points of contact. This carriage is connected by a link 12 with a hand lever 13, which extends upwardly to a point within convenient reach of the driver.

By means of a segment rack 14, and a spring pawl 15, controlled by the usual grip lever 16, it will be seen that this carriage may be moved forward or back and retained at any desired point with reference to the main beam.

The cutting blades or shoes 17 may be of any suitable or desired shape, and the inner ends are upturned and connected to arms or bearers 18, as clearly shown at 19. These arms are fulcrumed at their forward ends upon vertical pivot pins 20, and the rear ends of these arms diverge behind the points of attachment of the cutter blades, as shown at 18$^a$.

21 are rollers disposed in pairs upon the outer ends of the bar or carriage 11, and the divergent ends 18$^a$ of the levers extend between these rollers.

22 is a yoke fixed to the beam A having two arms extending downwardly. The rear arm forms a support for the bearings 20 of the levers 18; the front arm forms a support for a shield 23, which shield is convergent toward the front, and serves to prevent earth and weeds from becoming entangled with the mechanism at the rear.

The operation of the device will then be as follows: The cutters or blades 17 are set to any desired width between their outer ends, by means of the bar 11 and the lever 13, and held in the adjusted position by the pawl and segment before described. The team being started, the front and rear cutters will enter the ground, and as here used they are of such form as to shear off the roots of the weeds, allowing the material thus cut to fall behind the cutters as the apparatus proceeds. If at any point the distance between the rows in which the machine is traveling increases, it is only necessary to move the lever so as to cause the bar or carriage 11 to move forward upon the beam A. This movement causes the rollers 21 to slide along the divergent lever arms 18 thus forcing them apart, and at the same time correspondingly separating the blades or cutters and spreading them, so that they make an increased cut. If a narrow place is reached, where it is desirable to contract the apparatus, the lever 13 is moved in the opposite direction, and the arms 18 will be drawn in with a corresponding narrowing of the cut to be made. In this manner I provide an extemely flexible and readily operated apparatus.

Having thus described my invention, what I claim and desire to secure by Letters Patent is—

1. In a weed and like cutter, a main beam, upper and lower spaced arms extending substantially parallel with the length of the beam and arranged upon each side of said beam, vertical pins carried by the beam and upon which the forward ends of said arms are pivotally mounted, the rear ends of said arms being divergent and separable transversely, cutter blades having vertical shanks attached to the pivoted arms and horizontally divergent cutting portions, a transverse bar or carriage slidable upon the main beam, antifriction guides disposed in pairs upon each end of said carriage, between which guides the divergent ends of the pivoted arms extend, a hand lever, a link connecting it with the slidable bar, and a retaining pawl and ratchet mechanism whereby the bar or carriage may be adjusted to expand or contract the cutting blades.

2. The combination in a weed cutter, of a main beam with bearing-wheel, fixed cutter and handles, horizontal rearwardly divergent cutting blades having upwardly extending pins, said blades having their forward ends turned upwardly, arms or beams fulcrumed to the main beam at the front, and having divergent rear ends to which said beams the upward extensions of the cutting blades are connected, a transverse bar slidable upon the main beam having antifriction guides between which the divergent ends of the cutter carrying arms extend, and means by which the bar may be moved forward or back upon the beam.

3. A weed cutter consisting of a main beam, hinged rearwardly divergent blades, divergent arms or beams to which said blades are connected, a slidable bar or carrier having antifrictional devices, between which the rear ends of the cutter carrying arms extend, means by which the bar or carrier is moved forward and back to adjust the width of the cutters, a convergent shield inclosing the front of said operating mechanism, and means to regulate the depth of the cutter.

In testimony whereof I have hereunto set my hand in the presence of two subscribing witnesses.

MARCELLUS PRUYN.

Witnesses:
CHARLES A. PENFIELD,
CHARLES EDELMAN.